Dec. 25, 1934.  B. A. WITTKUHNS  1,985,756

TRUNNION TILT CORRECTOR

Filed Oct. 1, 1932  3 Sheets-Sheet 1

INVENTOR
BRUNO A. WITTKUHNS.
BY
Herbert H. Thompson
his ATTORNEY.

Dec. 25, 1934.  B. A. WITTKUHNS  1,985,756
TRUNNION TILT CORRECTOR
Filed Oct. 1, 1932  3 Sheets-Sheet 2

INVENTOR
BRUNO A. WITTKUHNS.
BY
Herbert H. Thompson
his ATTORNEY.

Dec. 25, 1934.  B. A. WITTKUHNS  1,985,756
TRUNNION TILT CORRECTOR
Filed Oct. 1, 1932   3 Sheets-Sheet 3
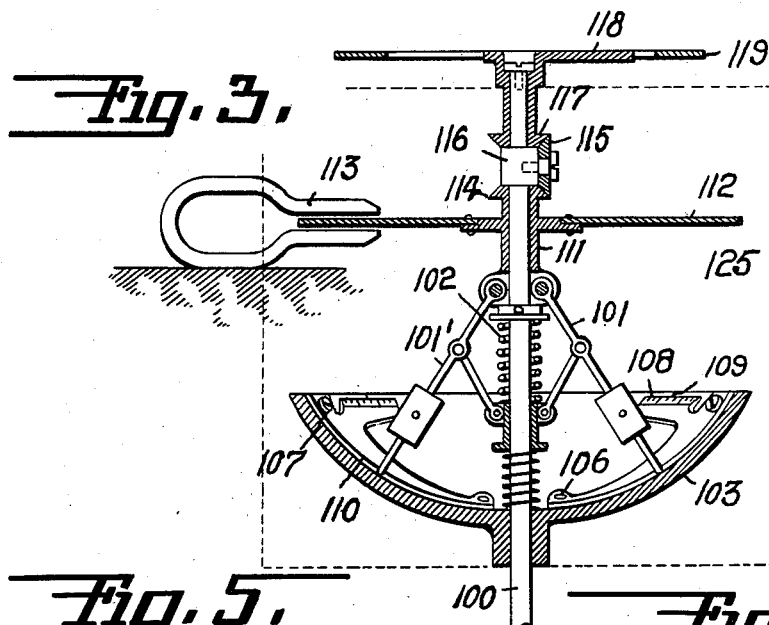
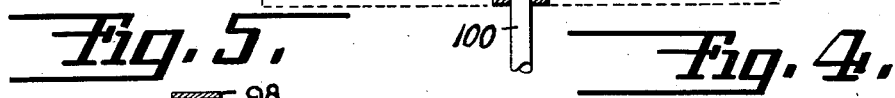
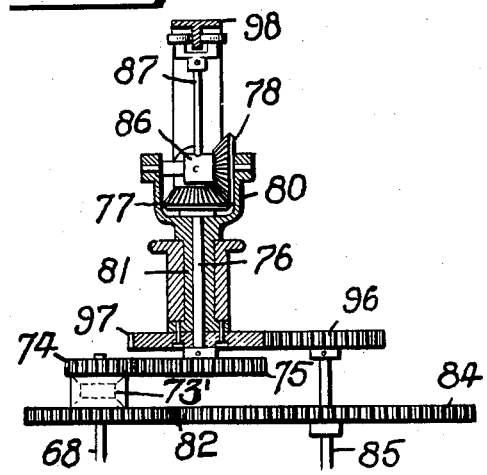
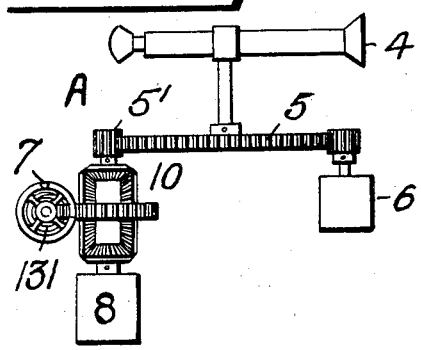
INVENTOR
BRUNO A. WITTKUHNS.
BY
Herbert H. Thompson
ATTORNEY Patented Dec. 25, 1934

1,985,756

UNITED STATES PATENT OFFICE 1,985,756

TRUNNION TILT CORRECTOR

Bruno A. Wittkuhns, Summit, N. J., assignor to Sperry Gyroscope Company, Inc., Brooklyn, N. Y., a corporation of New York Application October 1, 1932, Serial No. 635,734

13 Claims. (Cl. 89—41)

This invention relates to gun fire control apparatus for warships and more particularly to trunnion tilt correctors designed to keep the gun on the target regardless of the rolling and pitching movements of the ship. I am aware that such devices have been proposed heretofore, an example of which is shown in the patent to Bates No. 1,829,181 dated October 27, 1931. Such prior devices, however, required a separate complete correction unit including a gyro vertical for each battery on the ship. According to my present invention, I have designed a simple correction unit for each battery which may be operated from a common gyro vertical and gyro compass on the ship so that each ship need be provided with but one gyro vertical or artificial horizon and one compass for actuating the fire control systems for a plurality of batteries. A further object of the invention is to improve correction devices of this character whereby the original azimuth correction is reintroduced into the apparatus so that the true accurate correction is quickly arrived at. Further objects of the invention will be apparent from the following description.

Referring to the drawings,

Fig. 3 is a vertical section of a portion of the automatic pre-firing device forming a part of my correction unit.

Fig. 4 is a plan view of the same partly in section.

Fig. 5 is a sectional detail of the upper portion of my correction unit.

Fig. 6 is a sectional detail of the mounting for one of the target bearing sights.

Figure 1:
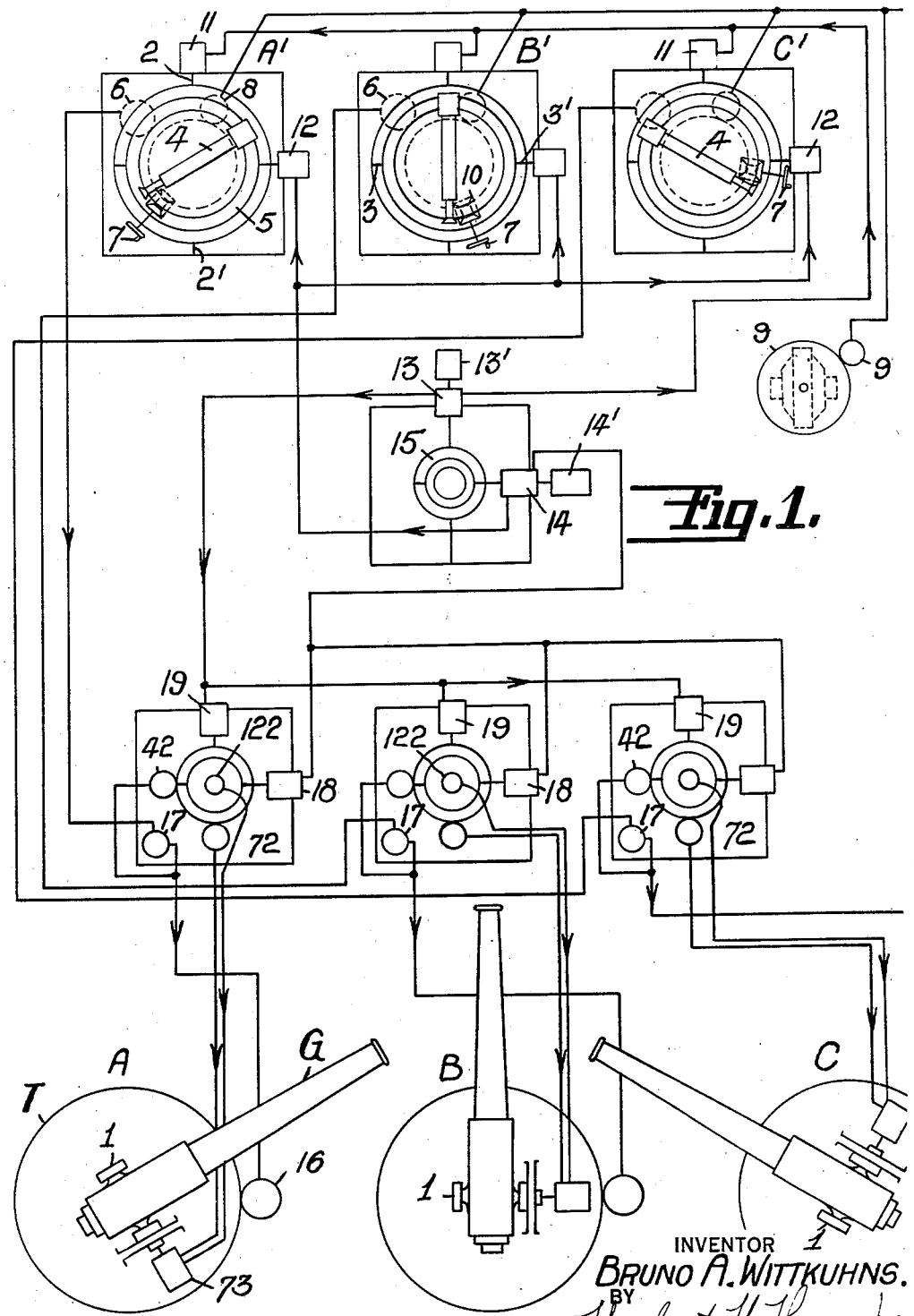
Fig. 1 is a single line diagram showing how my system is employed on a ship having (for example) three batteries and three sights using, however, only one gyro compass and one gyro vertical.

Referring first to the elementary diagram, the particular warship illustrated as an example is shown as having three batteries A, B and C, each of which is controlled from an independent sight A', B' and C', respectively. The guns G as usual are mounted in turrets T for rotation about vertical axes and on normally horizontal trunnions 1 in the turrets for elevational movements. Preferably the sights are each universally mounted for oscillation about fore and aft axes 2, 2' and transverse axes 3, 3'. The sights are also rotatable in azimuth, the sighting telescope 4 in each instance being mounted on a large gear 5 which drives the transmitter 6. The sight is preferably turned from a handwheel 7, but in order to keep the sight on the target, regardless of the turning or yawing of the ship, I preferably also connect thereto a repeater motor 8 actuated from the transmitter 9' on the gyro compass 9 on the ship. A differential gear 10 is shown interposed between the repeater motor, handwheel and sight, the driven arm of said gear train being shown as geared to the large gear 5 through pinion 5' (Fig. 6), one driving arm driven from worm 131 on handwheel 7 and the other driving arm driven from repeater motor 8, so that the sight may be set on any target by the handwheel 7 and will be kept thereon by the compass regardless of turning of the ship. Preferably also the sight is stabilized about both axes by repeater motors 11, 12 actuated from transmitters 13, 14 on the gyro vertical or artificial horizon 15. Said transmitters may be turned from the horizon through follow-up contacts (not shown) and power motors 13' and 14', if desired, or by follow-the-pointer hand drive systems by two operators, as known in the art.

It will also be understood that a power multiplying system may be used between the respective repeater motors and the sighting device, if desired, and that any type of repeater system may be employed, step-by-step, self-synchronous or otherwise.

The position of the sights is transmitted from transmitters 6 to repeater motors 16 at the guns preferably through a correction repeater transmitter 17 at each correction unit where the computed trunnion tilt correction is introduced. The transmitter-repeater 17 may be in the form of a mechanical or electrical differential such as shown in my prior application, Serial No. 564,817 filed September 24, 1931, the latter being preferably employed in case a self-synchronous A. C. transmission system is used. The gyro vertical not only stabilizes the sight but also preferably the correction unit, transmitter 14 actuating a repeater motor 18 about the transverse axis of the correction device and the transmitter 13 actuating the repeater motor 19 about the fore and aft axis of the device, said repeater motors being either with or without power multiplying devices, as desired.

Figure 2:
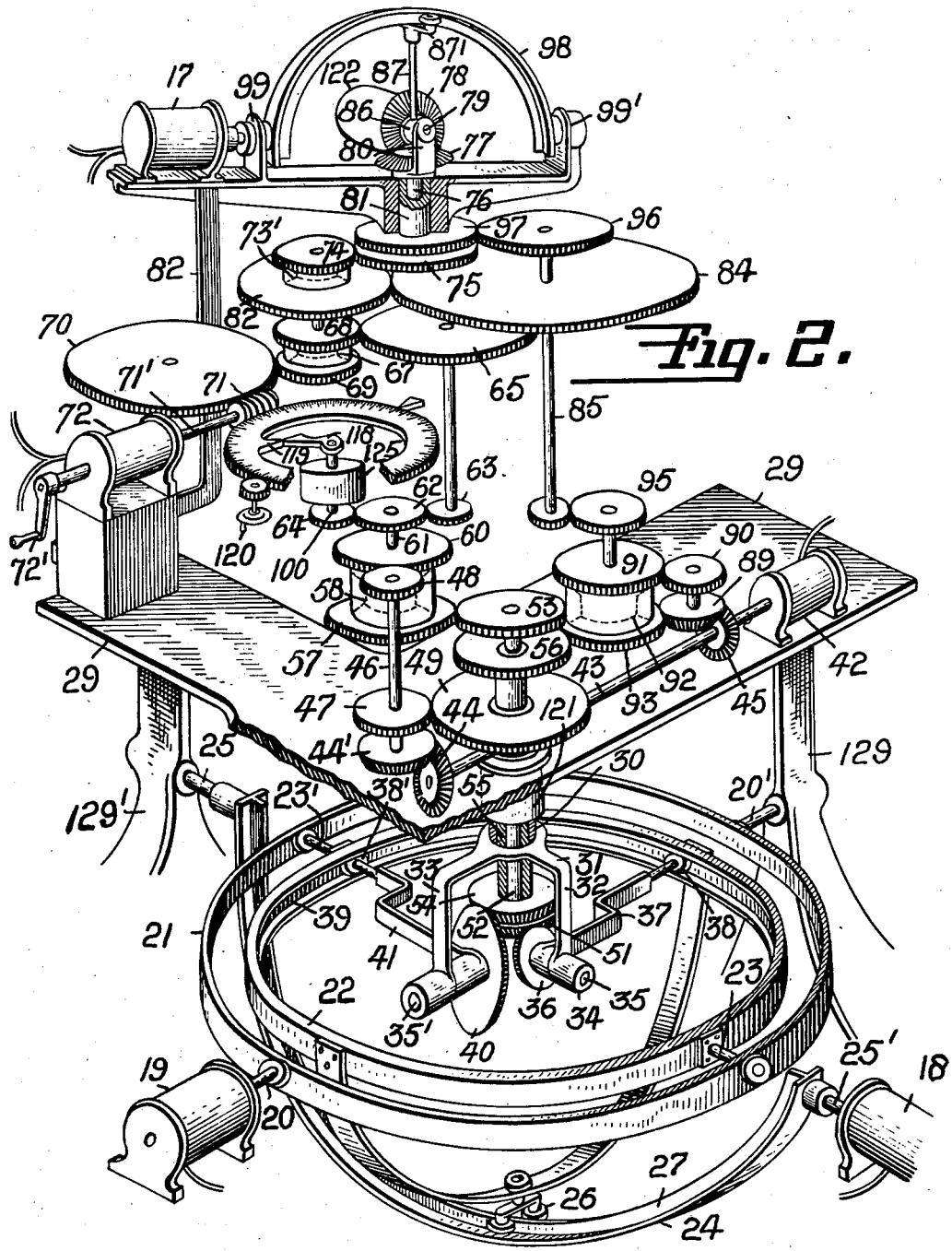
Fig. 2 is a perspective view, partly diagrammatic, showing one of my improved correction units.

Turning now to Fig. 2, the repeater motor 19 is shown as directly connected to the major or outer trunnion 20 of the gimbal ring 21, while the repeater motor 18 is shown as connected to the inner ring 22 (which is pivoted on minor axis 23 within the gimbal ring 21) by means of a bail or loop 24 pivoted on trunnions 25 and 25' normally in line with the trunnions 23, 23'. Said loop in turn is slidably connected with the ring 22 by means of a semi-circular ring 24 secured to the ring 22 and having rollers 26 at the bottom thereof which engage on each side of the flange 27 on the loop 24 so that ring 22 is compelled to move with the loop 24 about axis 23, 23' but is free to swing about axis 20, 20' independently of the loop 24. Supported above the gimbal ring system on a platform 29 is the correction mechanism, which is on an unstabilized part on fixed supports 129, 129'. The whole device with all its component parts may be mounted in any position with reference to the ship as long as the relative motions of ring 22 are derived from the gyro vertical. Journaled on said platform in bearing 121 and depending therefrom is a sleeve 30 which carries adjacent its lower end a bracket 31 having two arms 32, 33 extending at right angles to each other and having downwardly depending portions. This rotatable unit I term my resolving unit by which the rolling and pitching motions of the ship are resolved into a vertical plane containing the trunnion axis of the gun and a vertical plane at right angles thereto containing the line of fire. The arm 32 carries a journal 34 for a shaft 35 at its lower end. To said shaft is secured a bevel gear 36 and an arm 37 extending normally at right angles to the arm 32 and having journaled thereon at its outer end a roller 38 which engages a trackway 39 in the ring 22. Similarly a shaft 35' is journaled in the arm 33 and on said shaft is mounted a bevel gear 40 and an arm 41 which extends at right angles to the arm 37. Arm 41 may be likewise provided with a roller 38' which engages the trackway 39.

Means are provided for maintaining arms 41 and 37 parallel to the trunnion axis and the line of fire of the gun, respectively. To this end the sleeve 30 is positioned in azimuth directly or indirectly by a repeater motor 42 which is actuated either from the gun itself or from the sight through transmitter 6 and the electrical differential 17 as indicated in Fig. 1. Repeater motor 42 is shown as having mounted on the shaft 43 thereof a pair of bevel gears 44 and 45 driving respectively bevel gears 44' and 89. The shaft 46 of the former carries two spur gears 47 and 48, the former of which turns the gear 49. Gear 49 in turn is secured to the sleeve 30. It will readily be apparent, therefore, that since the ring 22 is stabilized about both horizontal axes that rolling and pitching of the ship will result in the rotation of the arms 37 and 41 about the axes of shafts 35 and 35', respectively, with the resultant turning of the bevel gears 36 and 40 through the resolved angles in the elevation and trunnion tilt planes. The turning of the bevel gear 36 turns a second bevel gear 51 on a central shaft 52 which in turn turns the gear 53 mounted on the upper end thereof. The turning of the bevel gear 40 on the other hand turns the bevel gear 54 on a sleeve 55 between the shaft 52 and the outer sleeve 30 and on the upper end of which is mounted a gear 56. Gear 53 in turn meshes with a gear 57 forming one arm of a differential gear train 58, the opposite arm being formed by a gear 60 meshing with the above described gear 48. Gear 60 is, therefore, moved in accordance with the azimuth position of the gun, while gear 57 is moved in accordance with the pitching of the gun about its trunnion axis. The latter motion is, of course, the main motion to be transmitted and the connection with the azimuth motor is merely for the purpose of preventing any relative motion between gears 49, 53 and 56, which should all respond to the azimuth motion with equal speed and direction without causing any motion of the gears 62 and 95. Thus is transmission of a false indication of elevation prevented by the differential 58. The planetary arm of said differential is connected to the shaft 61 carrying the gear 62 which meshes with a pair of pinions 63 and 64. The former is shown as turning a large gear 65 which in turn turns a gear 66 connected through a differential 67 to a shaft 68. The third arm of said differential is turned from a gear 69 meshing with large gear 70, which is turned from a worm 71 on the shaft of transmitter 72 which is set by handle 72' in accordance with the range or elevation desired, which is transmitted to the gun by differential repeater 73. Therefore, the shaft 68 is positioned in accordance with the algebraic sum of the gun elevation with respect to the ship's deck and the instantaneous angle of the ship's deck with respect to a horizontal plane through the trunnion axis. Said shaft turns through a differential 73', a gear 74, which in turn turns a gear 75 mounted on the inner shaft 76. The purpose of the differential 73' is to correct for the turning effect between the bevel gear 77 on said shaft and the bevel gear 78 on shaft 79 mounted in trunnion arms 80 secured to a sleeve 81, the third arm of the differential being provided by a large gear 82 driven from gear 84 on shaft 85 turned from trunnion arm 41, as hereinafter explained. Bevel gear 78 has secured to the face thereof a hub 86 from which projects an arm 87 which represents in miniature a gun. Said arm is swivelled at its outer end in a roller carriage 87' so that it may turn on its own axis without twisting the carriage. It will readily be seen, therefore, that arm 87 is given an elevation about the shaft 79 which corresponds to the actual normal elevation above the horizontal of the gun G and that it is maintained stabilized about said axis, the shaft 79 representing the trunnion axis of the gun. Note:—In Fig. 2 the rod 87, although shown vertical, really represents a horizontal position of the gun, since the actual position of these parts is immaterial as long as their relative position is correct. Said bracket 80 is turned about the vertical axis of shaft 76 with the sleeve 81 in accordance with the trunnion tilt of the gun, i. e., the roll of the ship in the vertical plane of the trunnions. Said sleeve 81 is being revolved by the rocking movements of trunnion tilt arm 41 which turns gears 40, 54 and 56 and gear 93 of "unwinding" differential gear train 92. The opposite arm is actuated from repeater motor 42 through gears 45, 89, 90 and 91, while the third arm turns the gear 95 and shaft 85 on which gears 84 and 96 are mounted. Gear 96 in turn meshes with a gear 97 on sleeve 81.

The carriage 87' on the rod or arm 87 is shown as having a sliding connection at its outer end with a loop 98 pivoted on axis 99, 99'. It will readily be seen that when the axis of shaft 79 is at an angle to the axis of the loop that rotation of the dummy gun about said axis (such as caused by rolling of the ship about the trunnion axis) will twist the loop about its axis 99, 99'. The movement of said loop is a measure of the azimuth trunnion tilt correction and this is transmitted from the transmitter 17 connected to said loop about said axis to the gun. Also, the relative sliding of the carriage along loop 98 due to the roll includes the elevation trunnion tilt correction. As above explained, said transmitter 17 is preferably in the form of an electrical differential having one winding connected to the transmitter 6 on the sighting telescope and the other member connected to said loop with the windings leading on to the repeater motor 16 on the gun. The gun, therefore, maintains its position in azimuth parallel to the sight regardless of the rolling and pitching of the vessel.

While the elevation correction may also be transmitted from my mechanism, this is not necessary as I may fire the gun when the ship is horizontal or at a predetermined point in the roll. To this end, there is mounted on the shaft 100 of the gear 64 a mechanism denoted generally at 125 for determining the point of fire which is preferably so designed as to prefire the gun slightly before the horizontal or other selected position of the ship is reached to allow for the angular velocity of the roll of the ship at the time. To this end, the shaft 100 has secured thereto a bowl shaped member 103 which drives a pair of weighted centrifugal arms 101 and 101' which fly out on being rotated against the action of compression spring 102. In said member 103 are a plurality of pivoted plates 104, 104', 105, 105'. Said plates may be adjusted about their center points 106 by means of set-screws 107 and with reference to scales 108 thereon which are read on indices 109, said plates being set in accordance with the known velocity of the projectile. The inner surface of each plate is curved as at 110 so as to form a guide for the arms 101 and 101'. Said arms are pivoted on a sleeve 111 loosely mounted on shaft 100 and having a disc 112 thereon with which cooperates a damper or retarding member 113, such as a magnetic brake. It will readily be seen, therefore, that the sleeve 111 will lag behind the bowl 103 and shaft 100 by an amount depending on the angular position of the arms 101, which in turn is proportional to the velocity of the ship's roll about the trunnion axis and in proportion to the other settings. Sleeve 111 is shown as having a bevel gear 114 thereon meshing with a bevel gear 115 forming a planetary arm of a differential gear train and pivoted on an enlargement 116 of shaft 100. The third arm of said train is formed by the bevel gear 117. This gear, which carries at its outer end a pointer or firing contact 118, will advance over the motion of shaft 100 by the same amount that the gear 114 lags behind. Said contact 118 cooperates with a fixed or stable contact 119 to fire the gun at the proper preset point in the ship's roll. If desired, the contact 119 may also be adjustable so as to vary the point in the roll at which the gun may be fired. This may be accomplished through setting handle 120. In such event my corrector also takes care of the elevation trunnion tilt correction, automatically, as hereinafter pointed out.

In my device it should also be noted that the azimuth and elevation correction is computed with extreme accuracy since the initial computed azimuth correction, as transmitted from the transmitter 17, is reintroduced into the mechanism by the connection between the transmitter 17 and the repeater motor 42 so that the final corrections are computed by the "flow" method, because the reintroduction of every successive correction for azimuth results not only in a new corrected azimuth but also a new corrected elevation, which in turn results in a new azimuth correction, and so forth.

As above stated, the change of true elevation of my device is measured by the relative angular movement between the carriage 87' and loop 98 in the plane of the loop during rolling and pitching or, in other words, by the angular twist of the shaft 79 within the bracket 80. This angle may be transmitted to the gun through repeater 73, if it is desired to stabilize the gun itself in the vertical plane through gun and target by means of a transmitter 122 mounted on bracket 80 and connected to shaft 79 which, therefore, transmits all angular movements of the shaft 79 including the elevation setting for range and the movements thereof due to rolling and pitching. The transmitter 122 will, therefore, stabilize the muzzle of the gun in elevation as well as position it at the proper elevation and introduce all elevation corrections due to trunnion tilt. As explained before, this correction is automatically reintroduced into the mechanism with the azimuth correction.

If it is desired to operate a ship's main battery, where usually the gun muzzle is not stabilized but the firing occurs at a selected point of the roll, the firing contact 118 takes care of the elevation corrections as the shaft 61 carries true corrected elevation from the resolving unit. In this case, the transmitter 122 is not used. The housing of this transmitter is mounted on separate bearings, not shown, in such a way that it may be locked either to the bracket 80 or to its rotor. In the latter case, the transmitter would not respond to any angular motions of arm 87. The repeater 73 then becomes an ordinary one motion repeater, instead of a differential repeater.

It can be clearly seen that my device can be readily used in connection with any suitable range or height finder (in case of anti-aircraft batteries) and with any suitable computer. All corrections for wind, future range and future azimuth can easily be introduced into the system by differential connections to the azimuth and elevation trains by means well known to the art. It is also obvious that my system lends itself readily to the employment of as many trunnion tilt computing devices as desired. Thus where it is desired to accurately and automatically maintain the sight on the target as well as the position of the gun in the future target position, a separate correction device may be employed for each, still employing but a single gyro vertical or artificial horizon and but a single gyro compass.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a correction system for multiple battery ships, the combination with a sight for each battery and a common artificial horizon, of a trunnion tilt correction computer for each battery, means on each computer for stabilizing an element of the same from said horizon, means on each computer positioned in accordance with the azimuth position of its connected sight, means on said computer positioned in elevation representing the desired gun elevation, computing means thereon for computing the trunnion tilt correction therefrom, and means for transmitting corrected bearings to the connected battery.

2. In a correction system for multiple battery ships, the combination with a plurality of sights and a common artificial horizon, of a trunnion tilt correction computer for each battery, means on each computer stabilized from said horizon, means on each computer positioned in accordance with the azimuth position of its connected sight and in elevation in accordance with the range, computing means thereon for computing the trunnion tilt correction therefrom, means for transmitting corrected bearings to the connected battery, and means for resetting each computer as the position of the battery is corrected.

3. A trunnion tilt correction system for the ship's batteries comprising the combination with a sight, a gun, a gyro-vertical, a computing device having a gimbal system, means for stabilizing the same against rolling and pitching from said gyro-vertical, unstabilized resolving means rotatable in any fixed plane representing the ship's deck and having a sliding connection with said gimbal system, means for positioning the resolving portions of the same in planes representing azimuth parallel to the vertical plane of the sight or gun barrel and trunnion axis, respectively, and means actuated thereby for computing all trunnion tilt corrections.

4. A trunnion tilt correction system for the ship's batteries comprising the combination with a sight, a gun, a gyro-vertical, a computing device having a gimbal system, means for stabilizing the same against rolling and pitching from said gyro-vertical, unstabilized resolving means rotatable in a plane representing the ship's deck and having a sliding connection with said gimbal system, means for positioning the resolving portions of the same in planes representing azimuth parallel to the vertical plane of the sight or gun barrel and trunnion axis respectively, means for setting in the range angle, and means actuated thereby for computing all trunnion tilt corrections.

5. A trunnion tilt correction system for the ship's batteries comprising the combination with a sight, a gun, a gyro-vertical, a computing device having a gimbal system, means for stabilizing the same against rolling and pitching from said gyro-vertical, unstabilized resolving means rotatable in a plane representing the ship's deck and having a sliding connection with said gimbal system, means for positioning the resolving portions of the same in planes representing azimuth parallel to the vertical plane of the gun barrel and the trunnion axis respectively, means actuated thereby for computing a trunnion tilt correction in azimuth, and means for continuously reintroducing said correction to reposition said resolving unit to produce azimuth corrections of higher order.

6. A trunnion tilt correction system for the ship's batteries comprising the combination with a sight, a gun, a gyro-vertical, a computing device having a gimbal system, means for stabilizing the same against rolling and pitching from said gyro-vertical, unstabilized resolving means rotatable in a plane representing the ship's deck and having a sliding connection with said gimbal system, means for positioning the resolving portions of the same in planes representing azimuth parallel to the sight or gun barrel and trunnion axis respectively, and computing means actuated thereby for computing both azimuth and elevation corrections and means for transmitting the same to the gun.

7. In a gun fire control system, a trunnion tilt correction device settable in accordance with the indicated bearing and range of the target with respect to the ship, means for transmitting therefrom bearing corrections, and means for reintroducing said corrections into the bearing of said device whereby accurate progressive corrections may be obtained by the flow method.

8. In a gun fire control system, a trunnion tilt correction device settable in accordance with the indicated bearing and range of the target with respect to the ship, means for transmitting therefrom elevation corrections, and means continually correcting for said corrections in azimuth of said device whereby accurate progressive corrections may be obtained by the flow method.

9. In a gun fire control instrument having means for firing the gun at a predetermined point in the roll, presetting means for compensating for the angular velocity of the ship at the time including centrifugal means positionable in accordance with said velocity, and means settable in accordance with muzzle velocity for cooperating therewith to introduce a correction factor to advance the point of fire.

10. In a gun fire control instrument having means for firing the gun at a predetermined point in the roll, presetting means for compensating for the angular velocity of the ship at the time including centrifugal means positionable in accordance with said velocity, a member oscillatable with the roll, pivoted plates thereon having edges of predetermined curvature for rotating said centrifugal means, and means positionable in accordance with the lag of said centrifugal means behind said cup for presetting the point of fire.

11. In a gun fire control instrument having means for firing the gun at a predetermined point in the roll, presetting means for compensating for the angular velocity of the ship at the time including centrifugal means positionable in accordance with said velocity, a member oscillatable with the roll, pivoted plates thereon having edges of predetermined curvature for rotating said centrifugal means, drag means for braking the rotation of said centrifugal means, and means positionable in accordance with the lag of said centrifugal means behind said cup for presetting the point of fire.

12. In a fire control correction system for warships, the combination with the sight and battery, of a plurality of trunnion tilt computing devices, one for each sight or firing angle employed, a common artificial horizon for stabilizing a part of each device, and a common gyro compass for maintaining a part of each of said devices fixed in azimuth regardless of yawing.

13. In a correction system for multiple battery ships, the combination with a sight for each battery, a common gyro compass, and a common artificial horizon, of a trunnion tilt correction computer for each battery, means on each computer for stabilizing an element of the same from said horizon, means on each computer positioned in accordance with the azimuth position of its connected sight as fixed by said gyro compass, means on said computer positioned in elevation corresponding to the desired gun elevation, computing means thereon for computing the trunnion tilt correction therefrom, and means for transmitting corrected bearings to the connected battery.

BRUNO A. WITTKUHNS.